United States Patent
Hikmet et al.

(10) Patent No.: US 11,007,707 B2
(45) Date of Patent: May 18, 2021

(54) METHOD FOR MANUFACTURING A 3D ITEM

(71) Applicant: SIGNIFY HOLDING B.V., Eindhoven (NL)

(72) Inventors: Rifat Ata Mustafa Hikmet, Eindhoven (NL); Paulus Albertus Van Hal, Waalre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/489,064

(22) PCT Filed: Feb. 26, 2018

(86) PCT No.: PCT/EP2018/054678
§ 371 (c)(1),
(2) Date: Aug. 27, 2019

(87) PCT Pub. No.: WO2018/162268
PCT Pub. Date: Sep. 13, 2018

(65) Prior Publication Data
US 2020/0009786 A1    Jan. 9, 2020

(30) Foreign Application Priority Data

Mar. 9, 2017    (EP) ..................... 17160091

(51) Int. Cl.
*B29C 41/22*    (2006.01)
*B29C 71/04*    (2006.01)
(Continued)

(52) U.S. Cl.
CPC .......... *B29C 64/118* (2017.08); *B29C 64/188* (2017.08); *B29C 64/295* (2017.08);
(Continued)

(58) Field of Classification Search
CPC ............ B29C 2035/0822; B29C 41/22; B29C 64/118; B29C 64/188; B29C 64/295;
(Continued)

(56) References Cited

U.S. PATENT DOCUMENTS

2005/0185113 A1   8/2005  Weindorf et al.
2012/0140436 A1   6/2012  Yang et al.
(Continued)

FOREIGN PATENT DOCUMENTS

EP    2447747 A1    5/2012
EP    2676784 A1    12/2013
(Continued)

*Primary Examiner* — Leo B Tentoni
(74) *Attorney, Agent, or Firm* — Daniel J. Piotrowski

(57) ABSTRACT

The invention provides a method for manufacturing a 3D item (1) by means of 3D printing. The method comprises the step of depositing, during a printing stage, 3D printable material (201) to provide 3D printed material (202), wherein the 3D printable material (201) comprises a core-shell filament (320) comprising (i) a core (321) comprising a core material (1321) having one or more of a core glass temperature $Tg1$ and a core melting temperature $Tm1$ and (ii) a shell (322) comprising a shell material (1322) having one or more of a shell glass temperature $Tg2$ and a shell melting temperature $Tm2$, wherein one or more of the shell glass temperature $Tg2$ and the shell melting temperature $Tm2$ is lower than one or more of the core glass temperature $Tg1$ and the core melting temperature $Tm1$. The method further comprises the step of heating, during a finishing stage, the 3D printed material (202) to a temperature equal to or higher than one or more of the shell glass temperature $Tg2$ and the shell melting temperature $Tm2$, and equal to or lower than one or more of the core glass temperature $Tg1$ and the core melting temperature $Tm1$.

7 Claims, 5 Drawing Sheets

(51) Int. Cl.

| | |
|---|---|
| *D01D 5/34* | (2006.01) |
| *D01D 10/02* | (2006.01) |
| *D01F 8/04* | (2006.01) |
| *D01F 8/10* | (2006.01) |
| *D01F 8/14* | (2006.01) |
| *D01F 8/16* | (2006.01) |
| *D02J 13/00* | (2006.01) |
| *B29C 64/118* | (2017.01) |
| *B33Y 10/00* | (2015.01) |
| *B33Y 70/00* | (2020.01) |
| *B33Y 80/00* | (2015.01) |
| *B29C 71/02* | (2006.01) |
| *B29C 64/295* | (2017.01) |
| *B29C 64/188* | (2017.01) |
| *B29C 71/00* | (2006.01) |
| *B29K 101/12* | (2006.01) |
| *B29C 35/08* | (2006.01) |

(52) U.S. Cl.
CPC ............ *B29C 71/009* (2013.01); *B29C 71/02* (2013.01); *B33Y 10/00* (2014.12); *B33Y 70/00* (2014.12); *B33Y 80/00* (2014.12); *B29C 2035/0822* (2013.01); *B29K 2101/12* (2013.01)

(58) Field of Classification Search
CPC ....... B29C 71/009; B29C 71/02; B29C 71/04; D01D 5/34; D01D 10/02; D01F 8/04; D01F 8/10; D01F 8/14; D01F 8/16; D02J 13/00

USPC .......... 264/172.15, 234, 236, 255, 308, 345, 264/347, 493

See application file for complete search history.

(56) References Cited

U.S. PATENT DOCUMENTS

| | | |
|---|---|---|
| 2012/0231225 A1 | 9/2012 | Mikulak et al. |
| 2013/0337256 A1 | 12/2013 | Farmer et al. |
| 2014/0231266 A1 | 8/2014 | Sherrer et al. |
| 2015/0174824 A1 | 6/2015 | Gifford et al. |
| 2015/0367576 A1 | 12/2015 | Page |
| 2016/0136885 A1 | 5/2016 | Nielsen-Cole et al. |
| 2016/0176109 A1 | 6/2016 | Farmer |
| 2016/0200047 A1 | 7/2016 | Mark et al. |
| 2016/0271874 A1 | 9/2016 | Tsai et al. |
| 2016/0370535 A1 | 12/2016 | Boomgaarden et al. |
| 2018/0012517 A1* | 1/2018 | Ropelato ................ G09B 23/32 |

FOREIGN PATENT DOCUMENTS

| | | |
|---|---|---|
| JP | 2014154349 A | 8/2014 |
| WO | 2015077262 A1 | 5/2015 |
| WO | 2016090164 A1 | 6/2016 |

* cited by examiner

METHOD FOR MANUFACTURING A 3D ITEM

CROSS-REFERENCE TO PRIOR APPLICATIONS

This application is the U.S. National Phase application under 35 U.S.C. § 371 of International Application No. PCT/EP2018/054678, filed on Feb. 26, 2018, which claims the benefit of European Patent Application No. 17160091.9, filed on Mar. 9, 2017. These applications are hereby incorporated by reference herein.

FIELD OF THE INVENTION

The invention relates to a method for manufacturing a 3D (printed) item, to a 3D printer for performing such a method, and to a computer program product for executing such method. The invention also relates to the 3D (printed) item obtainable with such method. Further, the invention relates to a lighting device including such 3D (printed) item.

BACKGROUND OF THE INVENTION

The use of extruded 3D printer inputs containing layers is known in the art. WO2015/077262, for instance, describes 3D printer inputs including filaments comprising separated layers or sections. These inputs particularly including filaments may be prepared by coextrusion, microlayer coextrusion or multicomponent/fractal coextrusion. These inputs and specifically filaments enable layering or combining different materials simultaneously through one or more nozzles during the so-called 3D printing process. These techniques facilitate smaller layer sizes (milli, micro, and nano) different layer configurations as well as the potential to incorporate materials that would otherwise not be usable in standard 3D printer methods.

EP-2676784 discloses a method of manufacturing an object, wherein the method comprises the step of feeding a filament to an extrusion head. The filament has a semi-crystalline polymeric reinforcement portion and a polymeric matrix portion. The reinforcement and matrix portions run continuously along a length of the filament. The reinforcement portion has a higher melting point and a higher crystallinity than the matrix portion. The temperature of the filament is raised in the extrusion head above the melting point of the matrix portion but below the melting point of the reinforcement portion so that the matrix portion of the filament melts within the extrusion head, thereby forming a partially molten filament within the extrusion head. The partially molten filament is extruded from the extrusion head onto a substrate, the reinforcement portion of the partially molten filament remaining in a semi-crystalline state as it is extruded from the extrusion head. Relative movement is generated between the extrusion head and the substrate as the partially molten filament is extruded onto the substrate in order to form an extruded line on the substrate. The matrix portion of the extruded line solidifies after the extruded line has been formed on the substrate.

SUMMARY OF THE INVENTION

Within the next 10-20 years, digital fabrication will increasingly transform the nature of global manufacturing. One of the aspects of digital fabrication is 3D printing. Currently, many different techniques have been developed in order to produce various 3D printed objects using various materials such as ceramics, metals and polymers. 3D printing can also be used in producing molds which can then be used for replicating objects.

For the purpose of making molds, the use of polyjet technique has been suggested. This technique makes use of layer by layer deposition of photo-polymerisable material which is cured after each deposition to form a solid structure. While this technique produces smooth surfaces the photo curable materials are not very stable and they also have relatively low thermal conductivity to be useful for injection molding applications.

The most widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Other terms for FDM are "fused filament fabrication" (FFF) or "filament 3D printing" (FDP), which are considered to be equivalent to FDM. In general, FDM printers use a thermoplastic filament, which is heated to its melting point and then extruded, layer by layer, (or in fact filament after filament) to create a three-dimensional object. FDM printers are relatively fast and can be used for printing complicated object.

FDM printers are relatively fast, low cost and can be used for printing complicated 3D objects. Such printers are used in printing various shapes using various polymers. The technique is also being further developed in the production of LED luminaires and lighting solutions.

Fused Deposition Modelling (FDM) is one of the most frequently used techniques used in producing objects based on additive manufacturing (3-D printing). FDM works on an "additive" principle by laying down plastic material in layers. Because of the nature of the process this in general leads to a rough ribbed surface finish. This may not always be desired, e.g. for decorative reasons, but also for functional reasons, such as reflectivity of the surface, treatability of the surface, etc. Hence, in some applications smooth surfaces are required. For this purpose various post surface treatment methods such as mechanical polishing and solvent treatment can be used. However, such methods are elaborate and/or may use additional chemicals. A heat treatment of the entire 3D printed product may lead to weakening of the product, and thus loss of shape and/or functionality.

Hence, it is an aspect of the invention to provide an alternative 3D printing method and/or 3D (printed) item which preferably further at least partly obviate(s) one or more of above-described drawbacks. The present invention may have as object to overcome or ameliorate at least one of the disadvantages of the prior art, or to provide a useful alternative.

Amongst others, it is herein suggested to use a filament having concentric layers or using a printer nozzle and filament feeders so that two kinds of materials leading to a material coming out of the nozzle in the form of concentric layers. Materials can be chosen to be glassy polymer with only a glass transition temperature and or semi-crystalline polymer with melting and also a glass transition temperature so that the outer surface is made of a polymer with lower Tg or melting temperature Tm than the Tg or melting temperature Tm of the core material. The object printed in this way than has a layer which has an outer surface which has a lower Tg or melting temperature Tm than the core polymer. Placing the object in an oven or IR radiator can heat up the outer polymer to a temperature above its Tg or Tm but remaining below the Tg or Tm of the inner polymer makes the outer polymer flow leading to a smooth surface structure. When the polymer is semi-crystalline then the melting temperature is leading In specific embodiments, the polymers are incompatible. Polymers which are incompatible cannot be mixed on a molecular level. When mixed together they become phase separated.

Hence, in a first aspect the invention provides a method for manufacturing a 3D item ("item" or "3D printed item"), wherein the method comprises the step of depositing, during a printing stage, 3D printable material ("printable material") to provide 3D printed material ("printed material", i.e. the printable material after deposition), wherein the 3D printable material comprises a core-shell filament, the core-shell filament comprising a core and a shell, the core comprising a core material having one or more of a core glass temperature (Tg1) and a core melting temperature (Tm1), and the shell (which may also be indicated as "jacket") comprising a shell material having one or more of a shell glass temperature (Tg2) and a shell melting temperature (Tm2), wherein one or more of the shell glass temperature (Tg2) and the shell melting temperature (Tm2) is lower than one or more of the core glass temperature (Tg1) and the core melting temperature (Tm1). The method further comprises the step of heating, during a finishing stage, the 3D printed material to a temperature equal to or higher than one or more of the shell glass temperature (Tg2) and the shell melting temperature (Tm2), and equal to or lower than one or more of the core glass temperature Tg1 and the core melting temperature Tm1. Hence, both the core material and the shell material comprise polymeric material.

With a method according to the first aspect of the invention, surface roughness may be diminished from e.g. µm dimensions of the filaments to nm dimensions after heating. Further, with such method relatively easily smoothening may be executed. If desired, the entire item can be heated essentially without loss of shape and/or functionality. Further, with such method, the backbone material which may essentially consist of the core material in each filament may stay essentially unaltered, while the surface is smoothened. Hence, a strong device with a relative smooth surface may be provided.

Heating can be done in different ways. In embodiments, heating comprises one or more of providing a hot gas to the 3D printed material, providing IR radiation to the 3D printed material, and heating the 3D printed material in a heating chamber. The heating can be executed after the 3D item has been provided, or after part thereof has been 3D printed. Hence, the finishing stage comprising heating may take place during printing or after printing or both. Heating may be done locally, e.g. local radiation, of a just printed part, or heating may be executed to the entire 3D printed item. Combinations of heating methods may also be applied. Hence, the printing stage and finishing stage may in time be combined or may be executed one after the other.

As indicated above, the heating may lead to a relative smooth surface. In specific embodiments, surface roughness below 10 µm, or even below 5 µm, or even below 1 µm may be obtained. Hence, heating may be subject to the roughness reduction. This may e.g. be measured with laser scattering. Hence, in embodiments, the 3D printed material forms a surface of the 3D item, and during the finishing stage the 3D printed material is heated until at least a part of the surface has a predetermined average surface roughness (Ra) equal to or lower than 5 µm for an area of at least 25 mm², such as at least 100 mm². In embodiments, the 3D printed materials forms the entire external surface of the 3D printed item, and may have such average surface roughness.

As indicated above, the method comprises depositing, during a printing stage, 3D printable material. Herein, the term "3D printable material" refers to the material to be deposited or printed, and the term "3D printed material" refers to the material that is obtained after deposition. These materials may be essentially the same, as the 3D printable material may especially refer to the material in a printer head or extruder at elevated temperature and the 3D printed material refers to the same material, but in a later stage when deposited. The 3D printable material is printed as a filament and deposited as such. The 3D printable material may be provided as filament or may be formed into a filament. Hence, whatever starting materials are applied, a filament comprising 3D printable material is provided by the printer head and 3D printed.

Herein, the term "3D printable material" may also be indicated as "printable material". The term "polymeric material" may in embodiments refer to a blend of different polymers, but may in embodiments also refer to essentially a single polymer type with different polymer chain lengths. Hence, the terms "polymeric material" or "polymer" may refer to a single type of polymers but may also refer to a plurality of different polymers. The term "printable material" may refer to a single type of printable material but may also refer to a plurality of different printable materials. The term "printed material" may refer to a single type of printed material but may also refer to a plurality of different printed materials.

Hence, the term "3D printable material" may also refer to a combination of two or more materials. In general, these (polymeric) materials have a glass transition temperature $T_g$ and/or a melting temperature $T_m$. The 3D printable material will be heated by the 3D printer before it leaves the nozzle to a temperature of at least the glass transition temperature, and in general at least the melting temperature. Hence, in a specific embodiment the 3D printable material comprises a thermoplastic polymer having a glass transition temperature ($T_g$) and/or a melting point ($T_m$), and the printer head action comprises heating the 3D printable material above the glass transition and if it is a semi-crystalline polymer above the melting temperature.

In yet another embodiment, the 3D printable material comprises a (thermoplastic) polymer having a melting point ($T_m$), and the printer head action comprises heating the 3D printable material to be deposited on the receiver item to a temperature of at least the melting point. The glass transition temperature is in general not the same thing as the melting temperature. Melting is a transition which occurs in crystalline polymers. Melting happens when the polymer chains fall out of their crystal structures, and become a disordered liquid. The glass transition is a transition which happens to amorphous polymers; that is, polymers whose chains are not arranged in ordered crystals, but are just strewn around in any fashion, even though they are in the solid state. Polymers can be amorphous, essentially having a glass transition temperature and not a melting temperature or can be (semi) crystalline, in general having both a glass transition temperature and a melting temperature, with in general the latter being larger than the former. The glass temperature may e.g. be determined with differential scanning calorimetry. The melting point or melting temperature can also be determined with differential scanning calorimetry.

As indicated above, the invention thus provides a method comprising providing a filament of 3D printable material and printing, during a printing stage, said 3D printable material on a substrate, to provide said 3D item. Materials that may especially qualify as 3D printable materials may be selected from the group consisting of metals, glasses, thermoplastic polymers, silicones, etc. Especially, the 3D printable material comprises a (thermoplastic) polymer selected from the group consisting of ABS (acrylonitrile butadiene styrene), Nylon (or polyamide), Acetate (or cellulose), PLA (poly lactic acid), terephthalate (such as PET polyethylene terephthalate), Acrylic (polymethylacrylate, Perspex, polymethylmethacrylate, PMMA), polypropylene (or polypropene), polystyrene (PS), PE (such as expanded-high impact-Polythene (or polyethene), Low density (LDPE) High density (HDPE)), PVC (polyvinyl chloride or polychloroethene), polycarbonate (PC), polysulfone, polyether sulfone, polyphenyl sulfone, an imide (such as a poly ether imide), etc. Optionally, the 3D printable material comprises a 3D printable material selected from the group consisting of urea formaldehyde, polyester resin, epoxy resin, melamine formaldehyde, rubber, etc.

Due to the heating of the printed material above the shell glass temperature, the surface smoothens, while the core material does not substantially weaken. Hence, the structure of the 3D item may remain intact, while the surface smoothens.

Depending upon the heating time, the heating may temporarily even over the core glass temperature, though especially over the entire heating time, the temperature is not that high. Hence, in specific embodiments the method comprises heating during the finishing stage the 3D printed material to a temperature equal to or lower than the core glass temperature (Tg1) and/or core melting temperature (Tm1), especially lower than the core glass temperature (Tg1) and/or core melting temperature (Tm1), but equal to or higher than shell glass temperature (Tg2) and/or shell melting temperature (Tm2), especially higher than shell glass temperature (Tg2) and/or shell melting temperature (Tm2). For instance, the heating may be at least 1° C., such as at least 5° C., like especially at least 10° C. over the shell glass temperature and/or shell melt temperature, and especially at least 1° C., such as at least 5° C., like especially at least 10° C. below the core glass temperature and/or core melting temperature. Instead of the term "glass temperature" also the term "glass transition temperature" may be used. When one or both of core material and shell material have a melting temperature, then instead of the glass temperature, the melting temperature can be chosen.

In general, the difference between glass temperature of the core material and shell material is at least 10° C., such as at least 20° C. Especially, materials are chosen that have a substantial difference between the glass temperatures. Hence, in specific embodiments the core melting temperature Tm1 or core glass temperature (Tg1) and shell melting temperature Tm2 or glass temperature (Tg2), whichever applies, differ with at least 40°, such as in the range of 50-150° C.

The following situations may be distinguished, wherein T indicates the processing time during the finishing stage:

| | Core: amorphous polymer | Core semi crystalline polymer |
| --- | --- | --- |
| Shell: amorphous polymer | Tg2 ≤ T ≤ Tg1, especially Tg2 < T < Tg1 | Tg2 ≤ T ≤ Tm1, especially Tg2 < T < Tm1 |

| | Core: amorphous polymer | Core semi crystalline polymer |
| --- | --- | --- |
| Shell semi crystalline polymer | Tm2 ≤ T ≤ Tg1, especially Tm2 < T < Tg1 | Tm2 ≤ T ≤ Tm1, especially Tm2 < T < Tm1 |

In embodiments, the core material may comprise one or more materials selected from the group consisting of polycarbonate (PC), polysulfone, PPS, PSU, High Tg PC (APEC (Covestro)), PBT, Crystalline PET, PEN, PEEK, etc., and the shell material may comprise one or more materials selected from the group consisting of amorphous polyethylene terephthalate (PET), amorphous copolyesters, ABS, PMMA, polystyrene, styrene methylmethacrylate, MABS, SBC, thermoplastic polyurethane, etc.

Hence, in specific embodiments, the core material may comprise one or more materials selected from the group consisting of polycarbonate (PC), polysulfone (PSU), polyphenyleen sulfide (PPS), high Tg (such as above about 183° C.) modified polycarbonate copolymer (APEC-1895 Coestro), polybutylene terephthalate (PBT), crystalline polyethylene terephthalate (PET), polyethylene naphthalate (PEN), polyether ether ketone (PEEK). In yet further specific embodiments, the shell material may comprise one or more materials selected from the group consisting of amorphous polyethylene terephthalate (PET), acrylonitrile butadiene styrene (ABS), poly(methyl methacrylate) PMMA, polystyrene (PS), styrene methylmethacrylate, methylmethacrylate acrylonitrile butadiene styrene (MABS), styrenic block copolymer (SBC), and thermoplastic polyurethane. Especially such materials may suitably be used for coreshell filament 3D printing of 3D items that may be finished such that a relative smooth surface may be obtained.

Further, it may be desirable that the materials differ in some respects. In specific embodiments, the core material has a core material viscosity and the shell material has a shell material viscosity, wherein at a temperature above the core glass temperature (Tg1) or core melting temperature Tm the core material viscosity is especially higher. This may allow a good and quick smoothening at the heating temperature during the finishing stage. Further, this may also allow a good processing during the printing stage. Preferably molecules with shorter chain length are used for the shell part. This enables faster flow of the material to obtain smooth surfaces. The melt flow rate, especially as specified by ISO-113 under conditions (300° C.; 1.2 kg), is especially higher than 20 cm³/10 min, more especially higher than 50 cm³/10 min and most especially higher than 100 cm³/10 min. In specific embodiments, the polymeric materials of the core and the shell may be incompatible. This may especially imply that there is essentially no mixing at the interface of the two layers (of core and shell). Bonding between the filaments may especially be provided by the shells.

In specific embodiments, the core-shell filament has a core diameter (d1) selected from the range of 100-3000 μm and wherein the shell thickness (d2) is selected from the range of 100-2000 μm, especially up to about 1000 μm, such as in the range of 100-500 μm. The core-shell filament may be provided and printed as such or may be generated in the printer head, such as with coextrusion printer head.

Due to the availability of the shell, adhesion between filaments may be affected, especially when the heating is applied. Hence, it may be desirable to have the thickness of the shell(s) between the filaments in the 3D printed material relatively thin, and especially thinner than of the 3D printable material (i.e. the material not yet printed). Therefore, in specific embodiments pressure is applied on the printable material while being deposited on the support or receiver item (i.e. including on 3D printed material on the receiver item). This pressure may especially be applied with the printer head. In this way, filament may be printed that have no essentially round cross-sectional shape but a compressed tubular shape, like extended along an axis. Therefore, in specific embodiments during printing pressure is applied to the core-shell filament to provide a deposited core-shell filament having a deformed core with a first dimension (h1) and a second dimension (w1) perpendicular to each other and perpendicular to a longitudinal axis (A) of the core-shell filament, that may especially have a ratio (h1/w1) of less than 1, such as less than 0.9, like less than 0.8, such as in the range of 0.2-0.6. As indicated above, the pressure may be applied with the printer head during depositing of the 3D printable material.

The printable material is printed on a receiver item. Especially, the receiver item can be the building platform or can be comprised by the building platform. The receiver item can also be heated during 3D printing. However, the receiver item may also be cooled during 3D printing.

The phrase "printing on a receiver item" and similar phrases include amongst others directly printing on the receiver item, or printing on a coating on the receiver item, or printing on 3D printed material earlier printed on the receiver item. The term "receiver item" may refer to a printing platform, a print bed, a substrate, a support, a build plate, or a building platform, etc. Instead of the term "receiver item" also the term "substrate" may be used. The phrase "printing on a receiver item" and similar phrases include amongst others also printing on a separate substrate on or comprised by a printing platform, a print bed, a support, a build plate, or a building platform, etc. Therefore, the phrase "printing on a substrate" and similar phrases include amongst others directly printing on the substrate, or printing on a coating on the substrate or printing on 3D printed material earlier printed on the substrate. Here below, further the term substrate is used, which may refer to a printing platform, a print bed, a substrate, a support, a build plate, or a building platform, etc., or a separate substrate thereon or comprised thereby.

The herein described method provides 3D printed items. Hence, in a second aspect the invention also provides a 3D printed item obtainable with the herein described method. Especially, the invention provides a 3D item comprising a surface formed from a 3D printed material, the 3D printed material comprising a plurality of core-shell filaments, each core-shell filament comprising a core and a shell, the core comprising a core material having core glass temperature (Tg1), and the shell comprising a shell material having a shell glass temperature (Tg2), wherein the shell glass temperature (Tg2) is lower than the core glass temperature (Tg1), and wherein at least part of the surface has an average surface roughness equal to or lower than 5 μm for an area of at least 25 mm$^2$.

Some specific embodiments in relation to the 3D printing method described above not only relate to the method but also to the 3D printed item. Below, some specific embodiments in relation to the 3D printed item are discussed in more detail.

As indicated above, the core glass temperature (Tg1) and shell glass temperature (Tg2) may differ with at least 40° C.

Specific materials described above in relation to the 3D printable material thus also apply to the 3D printed material.

Hence, in embodiments the core material may comprise one or more materials selected from the group consisting of polycarbonate (PC), polysulfone, PPS, PSU, High Tg PC (APEC(Covestro)), PBT, Crystalline PET, PEN, PEEK, etc., and the shell material may comprise one or more materials selected from the group consisting of polyethylene terephthalate (PET), of amorphous polyethylene terephthalate (PET), amorphous copolyesters, ABS, PMMA, polystyrene, styrene methylmethacrylate, MABS, SBC, thermoplastic polyurethane, etc.

As indicated above, one or more of the core-shell filaments have a deformed core with a first dimension (h1) and a second dimension (w1) perpendicular to each other and perpendicular to a longitudinal axis (A) of the core-shell filament that have a ratio (h1/w1) of less than 1. Especially, this may apply to at least 50%, such as at least 70% of all cores. Hence, at least 50% over the summed length of the cores has a deformed core. Further, adjacent cores may have a core-core distance (d23) selected from the range of at maximum 200 μm, such as at maximum 100 μm, like at maximum 50 μm, or even smaller, such as at maximum 20 μm.

The 3D item as described herein, and as obtainable with the method as described herein, may be substantially any kind of item. The 3D item herein is especially a body, which may be partly hollow or which may be a massive body. The 3D item may be a plate, a shaped article, etc., etc. Specific examples of items that may be created with the present invention and may be the result of the method described herein are e.g. an optical (translucent) filter, a reflector, a light mixing chamber, a collimator, a compound parabolic concentrator, etc.

The thus obtained 3D printed item may be functional per se. For instance, the 3D printed item may be a lens, a collimator, a reflector, etc. The thus obtained 3D item may (alternatively) be used for decorative or artistic purposes. The 3D printed item may include or be provided with a functional component. The functional component may especially be selected from the group consisting of an optical component, an electrical component, and a magnetic component. The term "optical component" especially refers to a component having an optical functionality, such as a lens, a mirror, a light source (like a LED), etc. The term "electrical component" may e.g. refer to an integrated circuit, PCB, a battery, a driver, but also a light source (as a light source may be considered an optical component and an electrical component), etc. The term magnetic component may e.g. refer to a magnetic connector, a coil, etc. Alternatively or additionally, the functional component may comprise a thermal component (e.g. configured to cool or to heat an electrical component). Hence, the functional component may be configured to generate heat or to scavenge heat, etc.

As indicated above, the 3D printed item may be used for different purposes. Amongst others, the 3D printed item may be used in lighting. Hence, in yet a further aspect the invention also provides a lighting device comprising the 3D item as defined herein. Especially, the 3D item may be configured as one or more of at least part of a lighting device housing, a wall of a lighting chamber, and an optical element. As a relative smooth surface may be provided, the 3D printed item may be used as mirror or lens, etc.

Returning to the 3D printing process, a specific 3D printer may be used to provide the 3D printed item described herein. Therefore, in a third aspect the invention also provides a 3D printer (such as fused deposition modeling 3D printer) for providing a 3D printable material to a substrate. The 3D printable material is of course the same material as already described hereinbefore in relation the method according to the first aspect of the invention. In other words, the 3D printable material comprises a core-shell filament, the core-shell filament comprising a core and a shell, the core comprising a core material having one or more of a core glass temperature Tg1 and a core melting temperature Tm1, and the shell comprising a shell material having one or more of a shell glass temperature Tg2 and a shell melting temperature Tm2, wherein one or more of the shell glass temperature Tg2 and the shell melting temperature Tm2 is lower than one or more of the core glass temperature Tg1 and the core melting temperature Tm1. The 3D printer comprises a printer head comprising a printer nozzle, a 3D printable material providing device configured to provide the 3D printable material to the printer head, and a heating system (for heating the 3D printed material). Especially, the 3D printer may further comprise a control system (C), wherein the control system (C) is configured to execute the method according to the first aspect of the invention, especially a method wherein during printing pressure is applied to the core-shell filament to provide a deposited core-shell filament having a deformed core with a first dimension (h1) and a second dimension (w1) perpendicular to each other and perpendicular to a longitudinal axis (A) of the core-shell filament that have a ratio (h1/w1) of less than 1. The 3D printable material providing device may provide a filament comprising 3D printable material to the printer head or may provide the 3D printable material as such, with the printer head creating the filament comprising 3D printable material. Hence, in embodiments the invention provides a 3D printer, such as a fused deposition modeling 3D printer, comprising (a) a printer head comprising a printer nozzle, and (b) a filament providing device configured to provide a filament comprising 3D printable material to the printer head, wherein the 3D printer is configured to provide said 3D printable material to the substrate.

Instead of the term "fused deposition modeling (FDM) 3D printer" shortly the terms "3D printer", "FDM printer" or "printer" may be used. The printer nozzle may also be indicated as "nozzle" or sometimes as "extruder nozzle".

Finally, in a fourth aspect the invention provides a computer program product that can be used to execute the method according to the first aspect of the invention, when executed on a 3D printer according to the third aspect of the invention. Hence, the invention provides a computer program product comprising instructions which, when the computer program product is executed by a controller of a 3D printer, causes the 3D printer to carry out the method as described herein. The controller of the 3D printer may be functionally coupled to the 3D printer, or it may be comprised by such a 3D printer.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
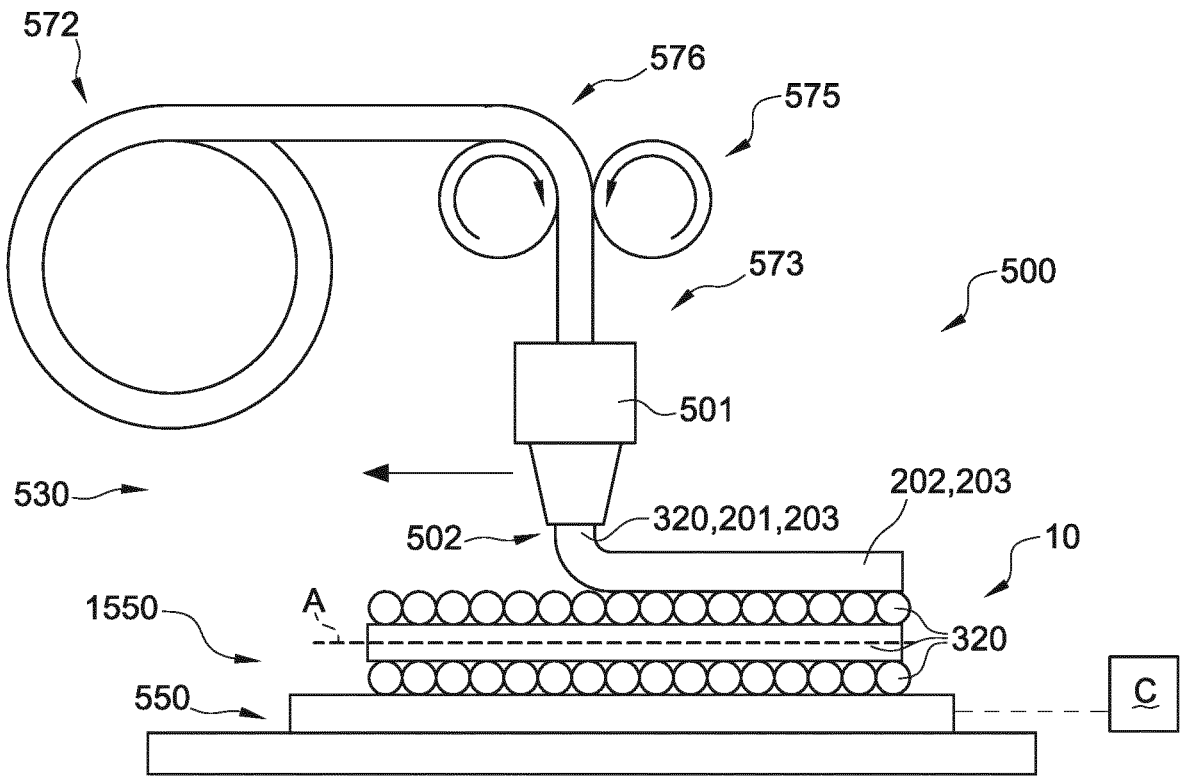
FIGS. 1a-1b schematically depict some general aspects of the 3D printer.

FIG. 1a schematically depicts some aspects of the 3D printer. Reference 500 indicates a 3D printer. Reference 530 indicates the functional unit configured to 3D print, especially FDM 3D printing; this reference may also indicate the 3D printing stage unit. Here, only the printer head for providing 3D printed material, such as a FDM 3D printer head is schematically depicted. Reference 501 indicates the printer head. The 3D printer of the present invention may especially include a plurality of printer heads, though other embodiments are also possible. Reference 502 indicates a printer nozzle. The 3D printer of the present invention may especially include a plurality of printer nozzles, though other embodiments are also possible. Reference 320 indicates a filament of printable 3D printable material (such as indicated above). For the sake of clarity, not all features of the 3D printer have been depicted, only those that are of especial relevance for the present invention (see further also below).

The 3D printer 500 is configured to generate a 3D item 10 by depositing on a receiver item 550, which may in embodiments at least temporarily be cooled, a plurality of filaments 320 wherein each filament 20 comprises 3D printable material, such as having a melting point $T_m$. The 3D printer 500 is configured to heat the filament material upstream of the printer nozzle 502. This may e.g. be done with a device comprising one or more of an extrusion and/or heating function. Such device is indicated with reference 573, and is arranged upstream from the printer nozzle 502 (i.e. in time before the filament material leaves the printer nozzle 502). The printer head 501 may (thus) include a liquefier or heater. Reference 201 indicates printable material. When deposited, this material is indicated as (3D) printed material, which is indicated with reference 202.

Reference 572 indicates a spool or roller with material, especially in the form of a wire. The 3D printer 500 transforms this in a filament or fiber 320 on the receiver item or on already deposited printed material. In general, the diameter of the filament downstream of the nozzle is reduced relative to the diameter of the filament upstream of the printer head. Hence, the printer nozzle is sometimes (also) indicated as extruder nozzle. Arranging filament by filament and filament on filament, a 3D item 10 may be formed. Reference 575 indicates the filament providing device, which here amongst others include the spool or roller and the driver wheels, indicated with reference 576.

Reference A indicates a longitudinal axis or filament axis.

Reference C schematically depicts a control system, such as especially a temperature control system configured to control the temperature of the receiver item 550. The control system C may include a heater which is able to heat the receiver item 550 to at least a temperature of 50° C., but especially up to a range of about 350° C., such as at least 200° C.

Figure 1B:
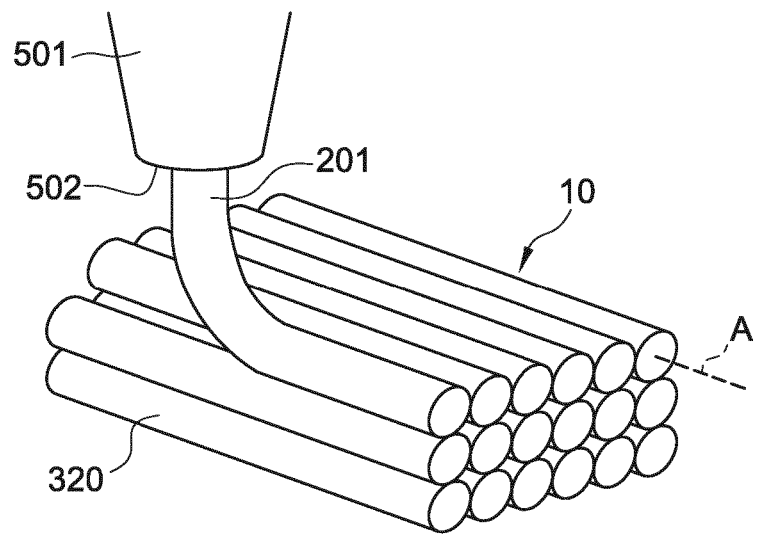

FIG. 1b schematically depicts in 3D in more detail the printing of the 3D item 10 under construction. Here, in this schematic drawing the ends of the filaments 320 in a single plane are not interconnected, though in reality this may in embodiments be the case.

Hence, FIGS. 1a-1b schematically depict some aspects of a fused deposition modeling 3D printer 500, comprising (a) a first printer head 501 comprising a printer nozzle 502, (b) a filament providing device 575 configured to provide a filament 320 comprising 3D printable material 201 to the first printer head 501, and optionally (c) a receiver item 550. In FIGS. 1a-1b, the first or second printable material or the first or second printed material are indicated with the general indications printable material 201 and printed material 202.

Figure 2A:
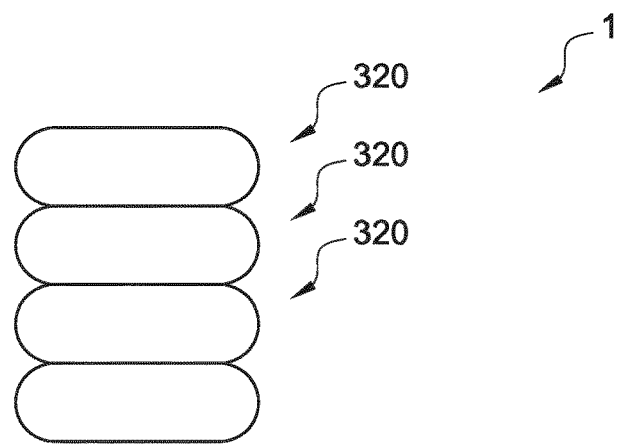
FIGS. 2a-2c schematically depict some aspects of the invention.

Fused Deposition Modelling (FDM) is one of the most frequently used techniques used in producing objects based on additive manufacturing (3-D printing). FDM works on an "additive" principle by laying down plastic material in layers. Because of the nature of the process this leads to a rough ribbed surface finish as schematically shown in FIG. 2a. FIG. 2a very schematically shows a 3D printed item 1 consisting of filaments 320.

Figure 2B:
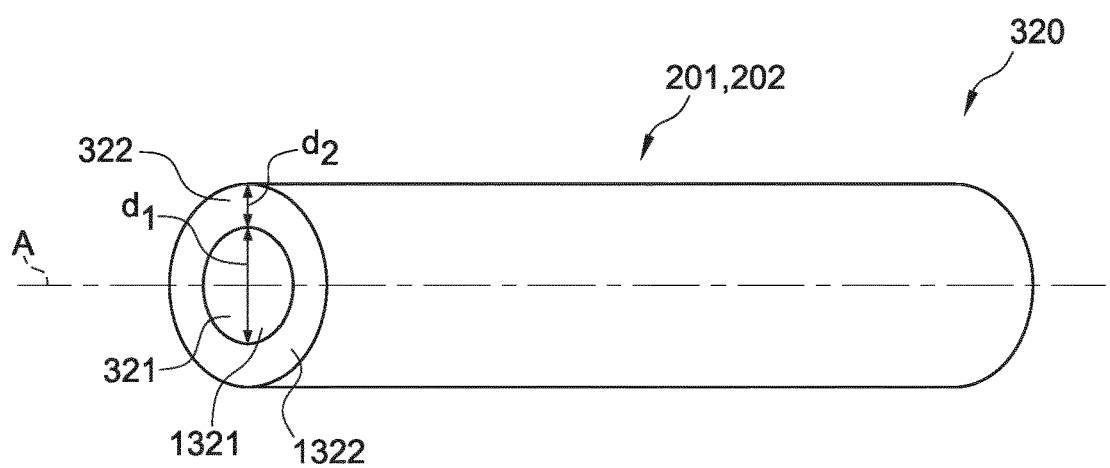

However in some applications smooth surfaces are required. Herein we suggest using a filament having concentric layers as shown below in FIG. 2b. The core is indicated with reference 321, and comprises core material 1321. The shell is indicated with reference 322, and comprises shell material 1322. The filament 320 shown may be printable 3D material 201, i.e. before depositing, or may refer to printed 3D material 202, i.e. after depositing. Hence both reference 201 and 202 are applied. The core-shell filament 320 has a core diameter d1 selected from the range of 100-3000 μm. The shell thickness (d2) may be selected from the range of 100-2000 μm. In general, the shell thickness is smaller than the core diameter.

Figure 2C:
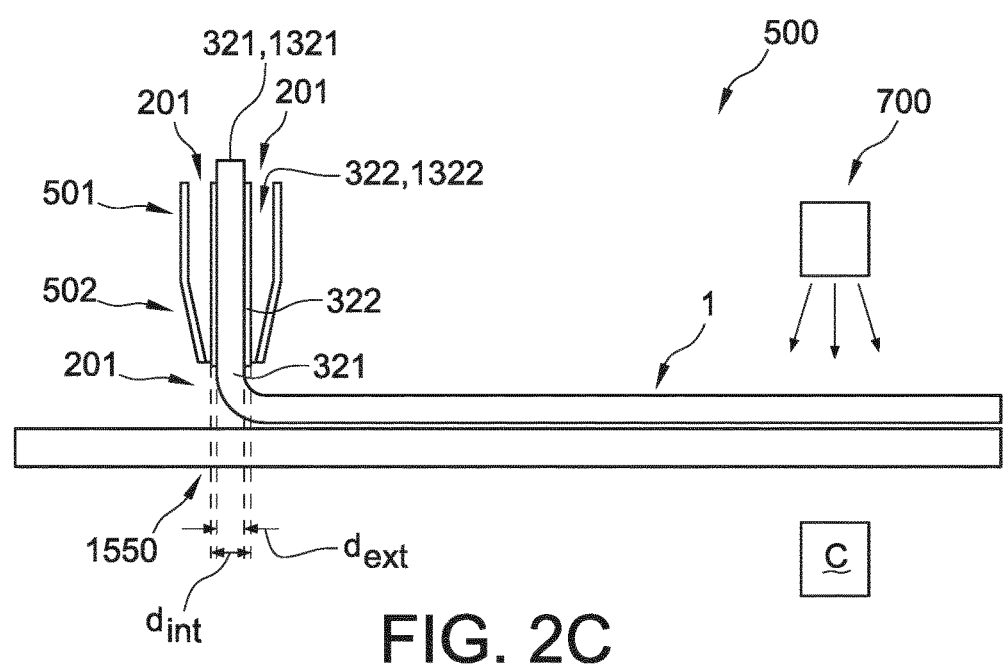

It is also possible to use a printer nozzle and filament feeders so that two kinds of materials leading to a material coming out of the nozzle is in the form of concentric layers. In FIG. 2c the cross-section of the nozzle and the material coming out of it is shown schematically. Such a system allows amongst others a method comprising 3D printing a 3D item 1, the method comprising depositing during a printing stage 3D printable material 201 to provide 3D printed material 202, wherein the 3D printable material 201 comprises a core-shell filament 320 comprising (i) a core 321 comprising a core material 1321 having one or more of a core glass temperature Tg1 and a core melting temperature Tm1 and (ii) a shell 322 comprising a shell material 1322 having one or more of a shell glass temperature Tg2 and a shell melting temperature Tm2, wherein one or more of the shell glass temperature Tg2 and the shell melting temperature Tm2 is lower than one or more of the core glass temperature Tg1 and the core melting temperature Tm1, wherein the method further comprises heating during a finishing stage the 3D printed material 202 to a temperature equal to or higher than one or more of the shell glass temperature Tg2 and the shell melting temperature Tm2.

FIG. 2c also very schematically depicts a fused deposition modeling 3D printer 500, comprising (a) a printer head 501 comprising a printer nozzle 502, and (b) a 3D printable material providing device (here not shown; see FIGS. 1a-1b)) configured to provide 3D printable material 201 to the printer head 501. The fused deposition modeling 3D printer 500 is configured to provide said 3D printable material 201 to a substrate 1550. The fused deposition modeling 3D printer 500 further comprises a heating system 700 and a control system C, wherein the control system C is configured to execute the method as described herein. By way of example, the heating system may be configured to provide IR radiation. The printer nozzle 502 has an internal diameter $d_{int}$ for the core and an external $d_{ext}$ diameter for the shell.

Figure 3A:
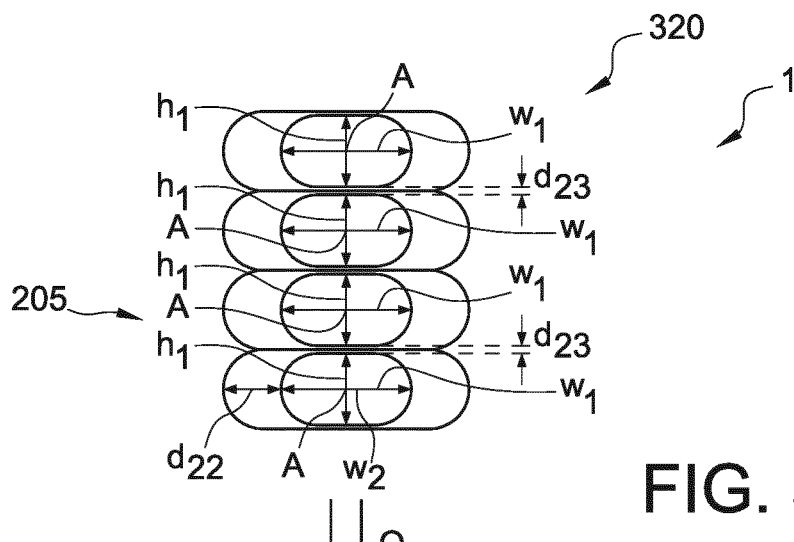
FIGS. 3a-3c schematically depicts some aspects in relation to e.g. filaments.
Figure 3B:
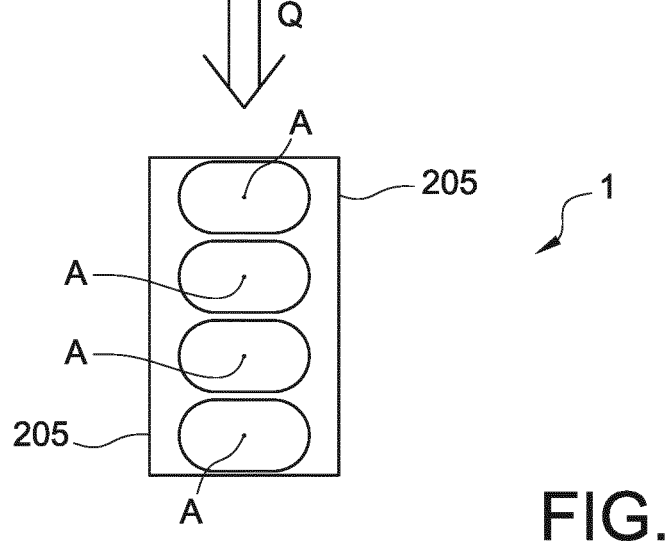

During printing, pressure may be applied to the core-shell filament 320 to provide a deposited core-shell filament having a deformed core 321 with a first dimension h1 and a second dimension w1 perpendicular to each other and perpendicular to a longitudinal axis A of the core-shell filament 320 that have a ratio h1/w1 of less than 1, see also FIGS. 3a-3b. In this way, also the original thickness of the shell 322, indicated with reference d2 in FIG. 2b, changes, as it may diminish between the two cores, as indicated with references d23, but may increase at the elongated sides, indicated with reference d22. Hence, for part of the deposited shell 322 may apply that d23<d2 and for other parts may apply that d22>d2. After application of heat, the surface may be smoothened, as is schematically shown in FIG. 3b. Hence, the printing conditions and the jacket thickness to core diameter is chosen such that after printing the layers on top of each other most jacket material is squeezed out and thin layer of jacket material is remains between the core material. In FIG. 3a schematically the cross-section of a structure made of core shell layers is shown. Core and jacket materials can be chosen so that the outer surface is made of a polymer with lower Tg than the Tg of the core material. The object printed in this way than has a layer which has an outer surface which has a lower Tg than the core polymer. Placing the object in an oven or IR radiator can heat up the outer polymer to a temperature above its Tg but remaining below the Tg of the inner polymer makes the outer polymer flow leading to a smooth surface structure as schematically shown in FIG. 3b. The surface is indicated with reference 205.

Figure 3C:
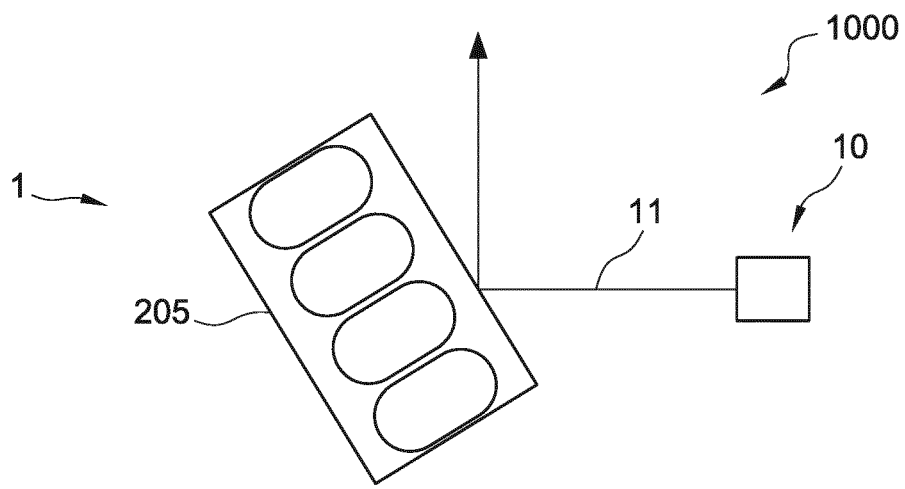

FIG. 3c schematically depicts an embodiment of a lighting device 1000 comprising the 3D item 1. The 3D item (1) is configured as one or more of at least part of a lighting device housing, a wall of a lighting chamber, and an optical element. Here, by way of example the 3D item 1 is configured as wall and/or (specular reflective) mirror.

EXPERIMENTAL

In one of the experiments, we used PC 2805 from makrolon as core material and XT PET as jacket material. The glass temperatures of PC and PET are 140 and 70° C., respectively. Hence we can use PC as skeleton material and anneal the sample at a temperature above 70° C. to smoothen the outer surface while keeping the outer form stable. We annealed the product overnight at a temperature of 130° C. The sample was printed using a nozzle with an outer diameter of $d_{ext}$ (d1+2*d2)=1800 μm, a core diameter of d1=1000 μm, and a layer height of h=200 μm. The ratio between PC and PET was 60:40. The structure was printed at 250° C. at a bed temperature of 60° C.

Figure 4:
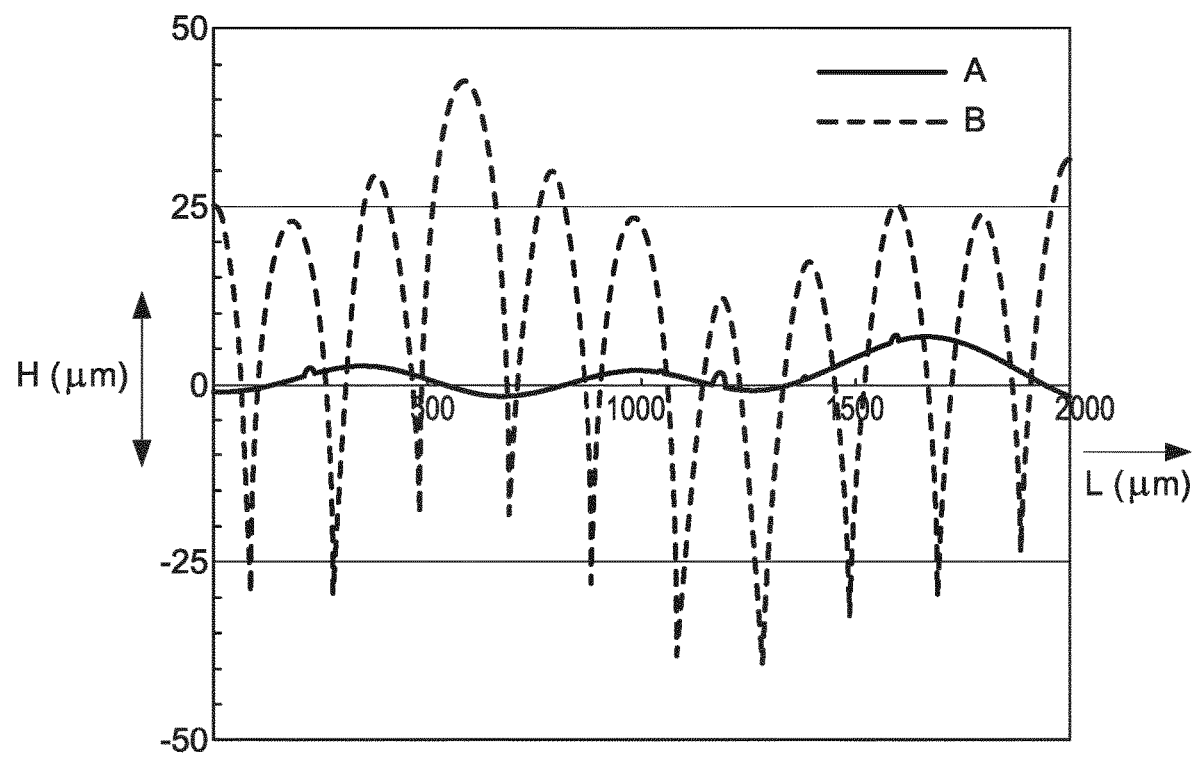
FIG. 4 shows roughness measurements (made with a DEKTAK 6M) of a cube printed with a layer height of 200 μm before and after annealing.

FIG. 4 shows roughness measurements (made with a DEKTAK 6M) of a cube printed with a layer height of 200 μm before and after annealing. Curve A indicates the heights of the surface after annealing and curve B the heights of the surface before annealing along a track with length L (here 2000 μm).

Figure 5:
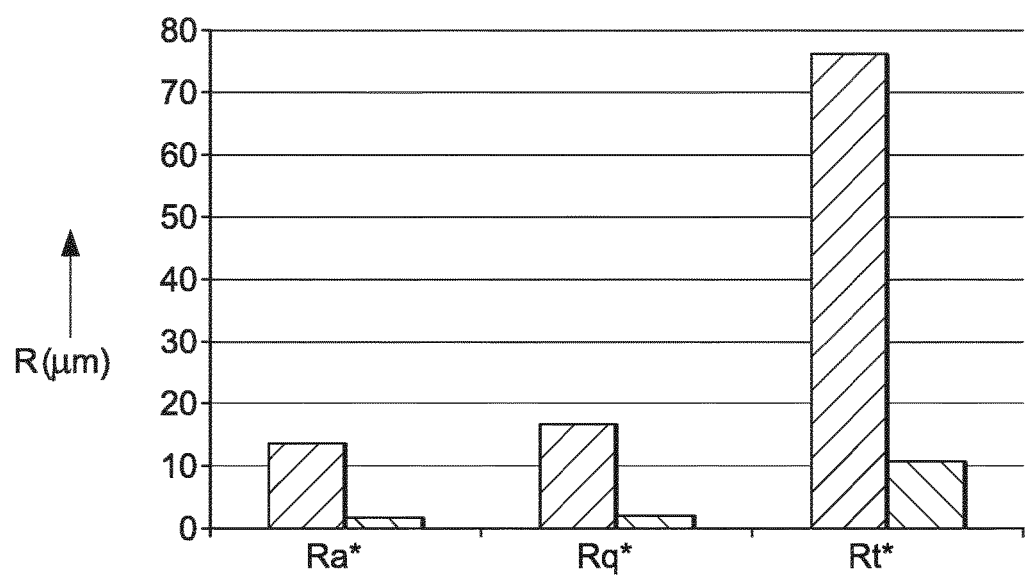
FIG. 5 shows the roughness of a 3D printed item before and after annealing.

In FIG. 5, the absolute roughness (Ra), root mean square roughness (Rq), and max height of profile (Rt) for the average values are plotted for the sample before and after annealing. Clearly, the roughness decreases by an order of magnitude after the annealing step. Before annealing we see the typical rough surface dominated by the layer height. After annealing, this structural feature is not observed anymore. The higher bars are before annealing and the lower bars are after annealing.

Figure 7:
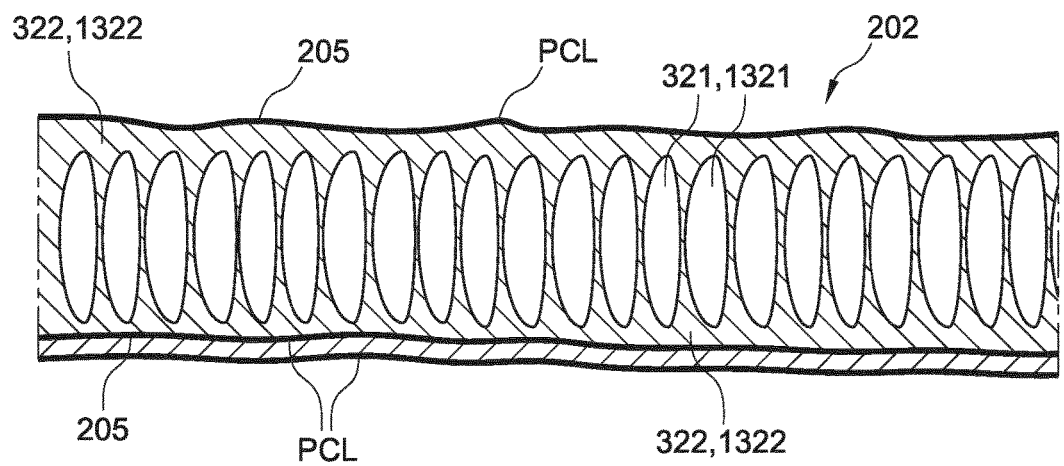

Microscopic pictures 6 and 7 show cross-sections of a FDM printed sample using a core jacket nozzle with black PC (Tg=140° C.) in the core, and transparent PET (Tg=70° C.) at the shell. In FIG. 7 the outer layer PCL is a thin white powder coated layer, which is fabricated after smoothening of the transparent PET layer is shown. Hence low amounts of powder coat material can be used for (further) smoothening, and hence amounts of expensive coating material (which are normally needed to fill up the openings) can be reduced. Direct after printing the structure is ribbed with a roughness that is essentially determined by the layer thickness of the print. After annealing this product at a temperature between Tg PET (70C) and Tg PC (140) i.e. 130 C for 2 hours, the outside 'melts' and hence the outside is smoothened as visualized by the microscopic picture and quantified by a DEKTAK measurement (see FIGS. 4 and 5). Importantly, the inside PC material is essentially not perturbed by the annealing as the ribbed structure in the black PC material is still present.

After annealing this product at a temperature between Tg PET (70 C) and Tg PC (140) i.e. 130 C for 2 hours, the outside 'melts' and hence the outside is smoothened as quantified by a DEKTAK measurement showing a sample before annealing, and the same sample after annealing. Samples had a layer thicknesses (h1+d23) of 200, 400, 600, and 800 μm.

Also experiments were executed with polysulfone and a high Tg PC.

Figure 6:
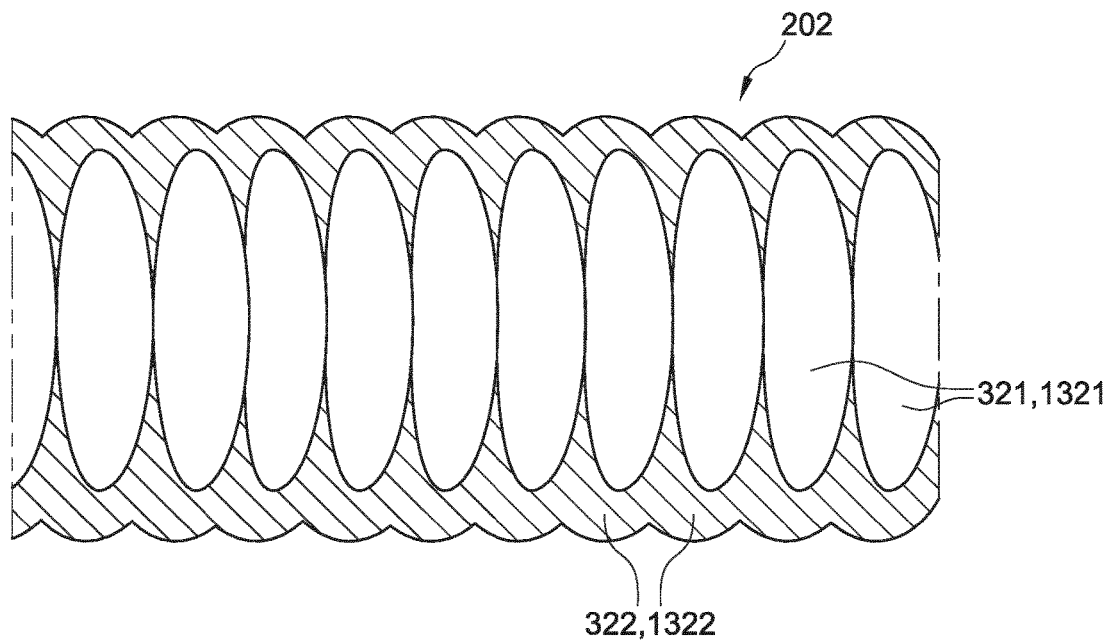
FIGS. 6-7 show line drawings of pictures of cross-section after deposition of a filament before (FIG. 6) and after (FIG. 7) annealing.

FIG. 6 show the material as deposited before heating where ribbed structures on the outside are visible. FIG. 7 shows the annealed sample which is then coated with a powder coating. As can be seen, the backbone consisting of the cores does essentially not change, whereas the shell smoothens. The layer thickness, i.e. from surface 205 to surface 205 is about 2000 μm. Furthermore the picture shows the powder coating layer (PCL) which covers the smooth outer surface.

Hence, the present invention may produce 3D structures with ribbon like internal structures but with a relative smooth surface, at least having a roughness much smaller than of the ribbon like internal structure.

The term "substantially" herein, such as "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

It goes without saying that one or more of the first (printable or printed) material and second (printable or printed) material may contain fillers such as glass and fibers which do not have (to have) influence on the on $T_g$ or $T_m$ of the material(s).

The invention claimed is:

1. A method for manufacturing a 3D item by means of 3D printing, wherein the method comprises the step of:
depositing, during a printing stage, a 3D printable material to provide 3D printed material, wherein the 3D printable material comprises a core-shell filament, the core-shell filament comprising a core and a shell, the core comprising a core material having one or more of a core glass temperature Tg1 and a core melting temperature Tm1, and the shell comprising a shell material having one or more of a shell glass temperature Tg2 and a shell melting temperature Tm2, wherein one or more of the shell glass temperature Tg2 and the shell melting temperature Tm2 is lower than one or more of the core glass temperature Tg1 and the core melting temperature Tm1, and
wherein the method further comprises the step of:
heating, during a finishing stage, the 3D printed material to a temperature equal to or higher than one or more of the shell glass temperature Tg2 and the shell melting temperature Tm2, and lower than one or more of the core glass temperature Tg1 and the core melting temperature Tm1.

2. The method according to claim 1, wherein one or more of (a) the core glass temperature Tg1 and shell glass temperature Tg2, (b) the core melting temperature Tm1 and the shell melting temperature Tm2, (c) the core melting temperature Tm1 and the shell glass temperature Tg2, and (d) the core glass temperature Tg1 and the shell melting temperature Tm2, differ with at least 40° C.

3. The method according to claim 1, wherein the core material comprises one or more materials selected from the group consisting of polycarbonate, polysulfone, polyphenyleen sulfide, high Tg polycarbonate, polybutylene terephthalate, crystalline polyethylene terephthalate, polyethylene naphthalate, polyether ether ketone, and wherein the shell material comprises one or more materials selected from the group consisting of amorphous polyethylene terephthalate, acrylonitrile butadiene styrene, poly(methyl methacrylate), polystyrene, styrene methylmethacrylate, methylmethacrylate acrylonitrile butadiene styrene, styrenic block copolymer, and thermoplastic polyurethane.

4. The method according to claim 1 wherein the core-shell filament has a core diameter selected from the range of 100-3000 μm, wherein the shell thickness is selected from the range of 100-2000 μm, and wherein the core diameter is larger than the shell thickness.

5. The method according to claim 1, wherein the heating step comprises one or more of (i) providing a hot gas to the 3D printed material, (ii) providing IR radiation to the 3D printed material, and (iii) heating the 3D printed material in a heating chamber.

6. The method according to claim 1, wherein the 3D printed material forms a surface of the 3D item (1), and wherein during the finishing stage the 3D printed material is heated until at least a part of the surface has a predetermined average surface roughness (Ra) equal to or lower than 5 μm for an area of at least 25 mm².

7. The method according to claim 1, wherein during the printing stage pressure is applied to the core-shell filament to provide a deposited core-shell filament having a deformed core with a first dimension and a second dimension perpendicular to each other and perpendicular to a longitudinal axis (A) of the core-shell filament that have a ratio of less than 1.

* * * * *